United States Patent

Kudla et al.

[11] Patent Number: 6,165,430
[45] Date of Patent: *Dec. 26, 2000

[54] METHOD FOR TREATING DIESEL ENGINE EXHAUST GAS

[75] Inventors: Robert J. Kudla, Warren; Chaitanya Kumar Narula, Ann Arbor; Mohinder S. Chattha, Northville, all of Mich.

[73] Assignee: Ford Global Technologies, Inc., Dearborn, Mich.

[*] Notice: This patent issued on a continued prosecution application filed under 37 CFR 1.53(d), and is subject to the twenty year patent term provisions of 35 U.S.C. 154(a)(2).

[21] Appl. No.: 09/118,810

[22] Filed: Jul. 20, 1998

[51] Int. Cl.⁷ .............. B01J 8/02; B01J 21/08; B01J 21/12; B01J 23/42

[52] U.S. Cl. .............. 423/213.5; 423/239.1; 502/238; 502/258; 502/262

[58] Field of Search .............. 423/213.5, 235, 423/239.1; 502/262, 238, 258

[56] References Cited

U.S. PATENT DOCUMENTS

| | | |
|---|---|---|
| 3,637,484 | 1/1972 | Hansford . |
| 3,856,707 | 12/1974 | Kato et al. . |
| 4,124,536 | 11/1978 | Itoh et al. .............. 423/239 |
| 4,197,187 | 4/1980 | Day et al. . |
| 4,272,409 | 6/1981 | Bergna . |
| 4,407,736 | 10/1983 | Pellet et al. . |
| 4,503,160 | 3/1985 | Williams, Jr. . |
| 4,526,885 | 7/1985 | Day et al. . |
| 4,581,126 | 4/1986 | Day et al. . |
| 4,619,908 | 10/1986 | Cheng et al. .............. 502/214 |
| 5,538,931 | 7/1996 | Heinrichs et al. . |
| 5,851,947 | 12/1998 | Hair et al. .............. 502/238 |

*Primary Examiner*—Tom Dunn
*Assistant Examiner*—Maribel Medina
*Attorney, Agent, or Firm*—Killworth, Gottman, Hagan & Schaeff, L.L.P.

[57] ABSTRACT

The invention is a selective reduction catalyst useful for converting exhaust gases generated by a diesel engine where the atmosphere is oxidizing. The catalyst comprises 5–40 wt. % silica of a silica/alumina sol-gel produced support carrying 0.25–4.0 wt. % platinum.

8 Claims, 1 Drawing Sheet

METHOD FOR TREATING DIESEL ENGINE EXHAUST GAS

FIELD OF THE INVENTION

The invention is directed to a catalyst useful to reduce nitrogen oxides in an oxidizing atmosphere (lean-burn operation), as during diesel engine operation. The catalyst comprises a composite oxide support, made of silica and alumina by sol-gel techniques, which support is loaded with platinum. More particularly, the composite support comprises an excess of alumina as compared to the silica.

BACKGROUND OF THE INVENTION

Catalysts are employed in the exhaust systems of automotive vehicles to convert carbon monoxide, hydrocarbons, and nitrogen oxides (NOx) produced during engine operation into nonpolluting gases. When the gasoline powered engine is operated in a stoichiometric or slightly rich air/fuel ratio, i.e., between about 14.7 and 14.4, catalysts containing precious metals like palladium and rhodium are able to efficiently convert all three gases simultaneously. Hence, such catalysts are often called "three-way" catalysts.

Diesel engines are commonly used in Europe and they are able to obtain enhanced fuel economy. Such engines operate under oxygen-rich conditions where the A/F ratio is greater than 19, generally 19–40. Three-way catalysts are able to convert carbon monoxide and hydrocarbons in such lean-burn (excess oxygen) operation but are not efficient in the reduction of NOx ($NO+NO_2$) during diesel operation. Efforts have thus been made in developing catalysts able to remove NOx under net oxidizing conditions in recent years. Development of efficient diesel catalysts to meet European upcoming diesel emission standards continues to prompt research into such development. Due to the nature of diesel engine exhaust, these catalysts must be able to reduce NOx at relatively low temperatures in an oxygen rich environment.

Diesel catalysts are often based on zeolite materials containing a precious metal like platinum which can have major drawbacks. Among the most important are a narrow temperature range of operation and loss of activity (and sometimes physical integrity) under the hydrothermal conditions of automotive exhaust gases. For example, a carrying platinum is generally only active at a relatively low temperature, i.e., less than 250° C. At higher temperatures the competitive oxidation of the reductant hydrocarbon molecules by oxygen is so fast that the removal of NOx drops off precipitously with rising temperature so as to make such catalyst inadequate for treating somewhat hotter exhaust streams. Conversely, when the active sites are transition metal ions exchanged into the cationic sites of the zeolite, the onset of SCR activity begins at temperatures greater than 400° C., which renders the catalyst inactive for catalysis during a large portion of the necessary temperature range of the desired catalytic operation. Other diesel catalysts are based on support materials such as silica, gamma-alumina, titanium oxide, zirconium oxide or some combination thereof. These catalysts have the drawback, however, that they either have rather low NOx conversion efficiencies or have narrow NOx conversion temperature windows.

Platinum impregnated alumina materials are considered viable candidates for the after-treatment of diesel exhaust at low temperatures. Such catalysts act to reduce the NOx through the use of hydrocarbons over a catalyst, the hydrocarbons being in turn oxidized. Previous work Kintaichi, Y.; Hamada, H.; Tabata, M., Sasaki, M., Ito, T., Catalysis Letters, 6 (1990) 239 has shown that modification of alumina with silica commercial leads to loss in the catalytic efficiency of alumina for decomposition of NO into $N_2$ in the presence of propane. Propane is commonly used as a test gas in simulated diesel exhaust gases. Furthermore, impregnation of alumina or alumina-silica with platinum leads to reduced conversion temperature and comparable efficiency for both systems. In a related study, Burch, R, Millington, P. J., Catal. Today, 29 (1996) 37 observed the activity of platinum-alumina and platinum-silica for NO conversion with propene and found that platinum-silica was more active than platinum-alumina. The contrasts of these results have been explained on the basis of the reactivity of platinum with various gases with the supports playing a minor role by modifying the metal surface properties. These studies suggested to us that platinum on alumina-silica would be less effective than platinum-alumina or platinum-silica depending on the choice of hydrocarbon as reductant.

We have now unexpectedly found that the NOx conversion efficiency of platinum-alumina can be improved significantly when a catalyst is made of platinum on silica/alumina if a particular composite oxide of silica/alumina is made by sol-gel techniques. The amount of silica in the composite oxide support is critical since improved NOx conversion activity is obtained upon increasing silica content from 10 to 30% by weight while further increase in silica content to 50% by weight results in a decrease in NOx conversion. Our explanation of this will be explained in detail below.

DISCLOSURE OF THE INVENTION

The invention is a catalyst useful for treating diesel engine exhaust gas. The catalyst comprises a support material carrying platinum. In particular, the support material is a composite oxide of silica-alumina (i) comprising 5–40 wt. % silica based on the total of silica and alumina and (ii) made by sol-gel techniques from a mixture of an alumina sol and a silica sol. The support carries 0.25 to 4 wt. % platinum. Preferably, the silica comprises about 30 wt. % of said silica-alumina support.

In another aspect, the invention is directed to a method of treating exhaust gases from a diesel engine, preferably an automotive engine, by having the gases contact the catalyst disclosed above.

DETAILED DESCRIPTION OF PREFERRED EMBODIMENTS

Figure 1:
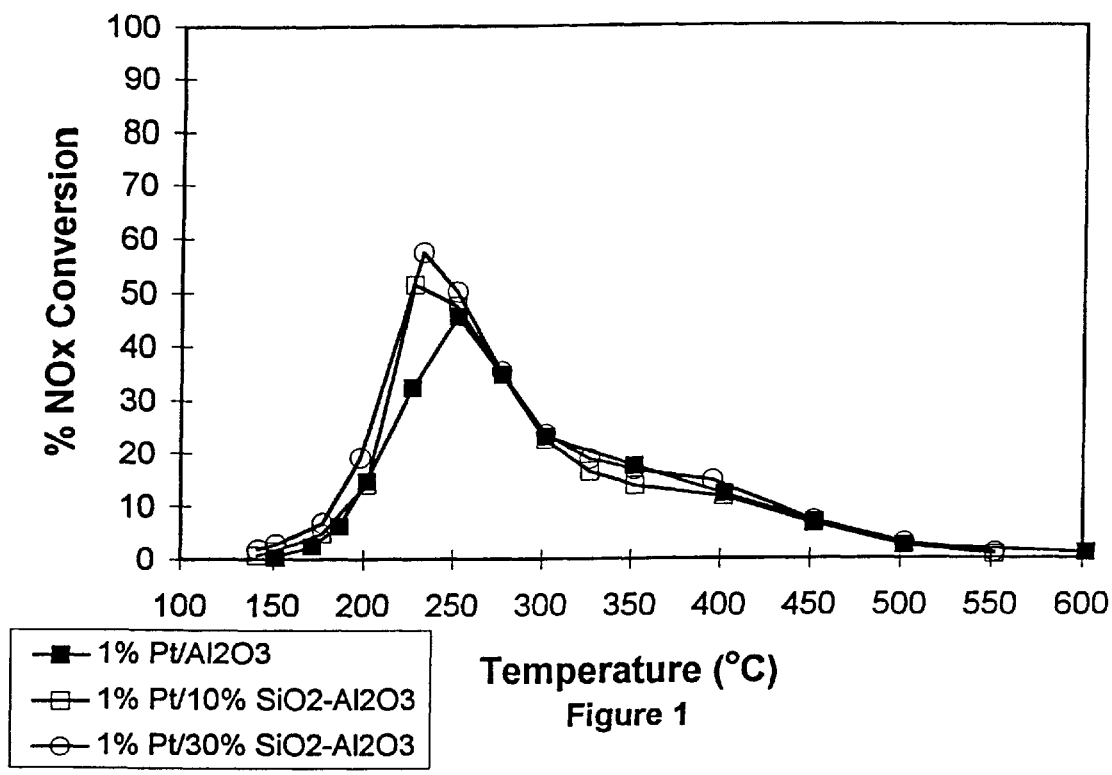
FIG. 1 is a graph which shows the NOx conversion as a function of temperature for 1% Pt/10% $SiO_2$—$Al_2O_3$, 1% Pt/30% $SiO_2$—$Al_2O_3$, and 1% Pt/50% $SiO_2$—$Al_2O_3$ catalysts, the first two prepared according to embodiments of the present invention and the third a comparative example, when exposed to simulated lean-burn engine exhaust. For further comparison, NOx conversion data over 1% Pt/$Al_2O_3$ catalyst are also presented.

The catalyst disclosed above is useful for treating internal combustion engine exhaust gases in an oxidizing environment at relatively low temperatures as occurs in diesel engine exhaust gas. The A/F ratio of the diesel engine is generally greater than 19, most often, 19–40. The present invention catalyst is useful for diesel applications because it has improved NOx activity at low temperatures and upon hydrothermal aging, even in the presence of sulfur, maintains its improved NOx conversion efficiency.

The present invention catalyst may be in a powder form or pelleted solid form, each in its broadest aspect includes: silica-alumina support material carrying platinum.

Critical aspects of one aspect of the invention include forming the composite support material in defined proportions of silica and alumina by sol-gel techniques. Accordingly, a sol is made of silica precursors and a sol is made of alumina precursors and then the sols are mixed. This mixture is further processed to form the composite oxide support product. The resultant support requires particular proportions of these two oxides in the composite oxide, i.e., between 5–40 wt. % silica based on the total weight of silica and alumina in the composite oxide. Preferably, the support comprises about 30 wt. % silica. We have found that, outside this range of silica in the composite support, the efficiency of the catalyst decreases significantly. For example, as described in a comparative example detailed below, a 50% w/w concentration of silica/alumina does not enhance the activity of platinum/alumina materials. A comparison of the surface area and pore diameter of two embodiment examples with this comparative example shows that all three support materials are not significantly different in these physical properties. Thus, the improvement in NOx conversion efficiency of platinum/alumina with 30 wt. % silica can not be easily explained based on differences in these properties. The precise mechanism explaining this enhancement is being studied. At this time, we believe the enhanced activity using the invention catalyst is due to a combination of surface properties such as surface area, porosity and surface acidity. Neither the accuracy nor understanding of this theory is necessary, however, to practice of this invention. It is put forward merely to attempt to explain the unexpected improvements provided by this present invention.

The composite oxide support can be made from any sol-solution mixture of alumina and silica precursor materials as would be apparent to one skilled in the art in view of the present disclosure. For example, it can be made from metal salts such as halides, nitrates, alkoxides, the latter represented by formula $M(OR)_n$ wherein R represents preferably a lower alkyl group, M represents a metal element selected from the group consisting of Si or Al, n being the valence of M. By lower alkyl group is meant $C_1$ to $C_4$. The preferred composite oxide forming materials are made from alkoxides, alumina and silica based, because these have good temperature characteristics and high gas-transport properties. The making of such sol-solutions is well known to those skilled in the art. In the case of alkoxides, it generally involves (1) acid or base catalyzed hydrolysis of metal alkoxides in water and/or parent alcohol or (2) modification of metal alkoxides with organics such as acetylacetone and subsequent hydrolysis or (3) direct hydrolysis in water and peptization in the presence of acid. Exemplary alkoxides include, but are not limited to, aluminum sec-butyl oxide, aluminum isopropoxide, silicon tetraethoxide, and silicon isopropoxide. Still others will be apparent to those skilled in the art in view of the present invention. In the case of nitrates or halides, it would be made by hydrolysis and subsequent peptization as is well known in the art of sol-gel coatings. For example, aluminum sec-butyl oxide can be hydrolyzed in water and peptized in the presence of dilute mineral acids to obtain alumina sol. The silica sol can be prepared, for example, using a dilute mineral acid and silicon tetraethoxide in ethanol and water. Addition of the alumina sol to the silica sol gives alumina-silica composite oxide powders. Use of nitrates or halides has the drawback that salts are present.

It is expected that the sols would be made individually and then mixed in the proper proportions to yield the desired resultant composite support. After the sols are mixed, the mixture is dried to remove solvent and yield the composite oxide. This may be done at room temperature or enhanced by elevated temperature drying. Volatiles are generally completely removed and powders are generally pyrolyzed in air at an elevated temperature such as 600° C. (10° C./minute, hold 4 hours). The support may include other materials added to the composite oxide described above in minor proportions to stabilize or otherwise enhance the support properties. Stabilizer materials commonly included in oxide materials to be used at elevated temperatures would be useful, for example, La, Le, Ti, Ba, or Zr. When included they would be used in an amount up to about 25 wt. % based on the total weight of the support.

The catalyst of this invention also includes platinum provided on the composite oxide support in an amount of 0.25 to 4 wt. % based on the total weight of the composite oxide support. Preferably, the platinum is loaded in an amount of 0.5 to 2 wt. % on the mixed oxide support. The platinum may be provided by any suitable means including wet impregnation techniques from soluble platinum compounds. Water soluble compounds are preferred, including, but not limited to nitrate, salts. In addition to this incorporation from a liquid phase, the platinum may be provided by sublimation of platinum chloride or other volatile platinum salts: by solid state exchange in the 300–500° C. temperature range using labile platinum compounds. In addition to platinum, the catalyst may include rhodium in relatively small amounts, optimally 0.01–0.2 wt. % based on the weight of the composite support. Rhodium is desirably included since it provides a broadening of the NOx conversion window due to increased conversion efficiency of nitrogen oxides at higher temperatures.

As is known in the art, for useful application of the catalyst in an exhaust system, the catalyst will be deposited or washcoated on a substrate (mechanical carrier) made of a high temperature stable, electrically insulating material such as cordierite, mullite, etc. A mechanical carrier is preferably comprised of a monolithic magnesium aluminum silicate structure (i.e., cordierite), although the configuration is not critical to the catalyst of this invention. It is preferred that the surface area of the monolithic structure provide 50–1000 meter square per liter structure, as measured by $N_2$ adsorption. Cell density should be maximized consistent with pressure drop limitations and is preferably in the range of 200–800 cells per square inch of cross-sectional area of the structure. The substrate may be in any suitable configuration, often being employed as a monolithic honeycomb structure, spun fibers, corrugated foils or layered materials. Still other materials and configurations useful in this invention and suitable in an exhaust gas system will be apparent to those skilled in the art in view of the present disclosure.

If the catalyst is to be applied to the substrate, rather than being used in pellet form, the powder catalyst can be made into a slurry with liquid, usually water, and then coated on the substrate followed by drying. Applying the powder described above onto a monolith should result desirably in a loading of platinum in total of 0.05–1.4 wt. % on a finished substrate (based on the weight of the substrate). Alternately, the composite oxide support can be washcoated on the substrate and after dried, be impregnated with the precious metal as by contacting the coated monolith with the platinum solution.

EXAMPLE 1

This example describes preparation of lean-Nox catalysts useful to treat exhaust gases emitted from lean-burn engines, including diesel, according to an embodiment of the present invention. The Pt/silica-alumina catalyst is prepared as follows.

Alumina sol: Aluminum tris(sec-butoxide), (9.85 g) was added to distilled water (80 ml) at 80° C. with stirring. A white precipitate immediately formed which remained in suspension. The suspension was kept at 90° C. for one hour, and nitric acid (2.8 ml of 1.0M) was added to the suspension. The alumina-sol so formed was boiled in an open flask to remove sec-butanol and peptized for 16 hours at 90° C.

Silica sol: A silica sol was prepared by mixing silicon tetra-ethoxide (6.25 g), water (1.62 g), and nitric acid (0.13 ml of 1.0 M) in ethanol (41.56 ml) in a screw cap bottle. The sol was aged for two weeks prior to its use in the preparation of alumina-silica powders.

Alumina-silica powders: The silica-alumina composite oxide powders containing 10 and 30% silica content by weight were prepared by adding the requisite amount of silica sol to alumina sol and removing the volatiles. During the removal of volatiles, gelation occurred. After complete removal of volatiles, white granular solids were obtained which were pyrolyzed in air at 600° C. (10° C./min, hold 4 hour).

EXAMPLE 2

According to other embodiments of the invention, the hydrolysis of $(RO)_3Si$—O—$Al(OR)_2$, R=Et, t-Bu, etc. and $Al(OR)_3$ in amounts dissolved in tetrahydrofuran furnishes 10% $SiO_2$—$Al_2O_3$ and 30% $SiO_2$—$Al_2O$ powders.

EXAMPLE 3

For comparative reasons, other examples were prepared, including one along the lines of Example 1 except that the amount of silica was 50 wt. % of the silica/alumina mixed oxide. Another comparative support material was modified $\gamma$-$Al_2O_3$ powder (particle size 20–40 mesh).

BET surface area and average pore diameter of 1% Pt/10% $SiO_2$—$Al_2O_3$ (316 m$^2$/g, 53 Å), 1% Pt/30% $SiO_2$—$Al_2O_3$ (386 m$^2$/g, 57 Å), and 1% Pt/50% $SiO_2$—$Al_2O_3$ (362 m$^2$/g, 33 Å) are measured on a Micromeritics ASAP-2400 instrument using physical adsorption of nitrogen.

All of the alumina-silica and $\gamma$-$Al_2O_3$ particles described above are contacted with chloroplatinic acid (precursor for platinum) solution to deposit, by incipient wetness, 1% Pt by weight on alumina-silica and $\gamma$-alumina. The impregnated supports are kept at room temperature overnight, dried at 105° C. for 1 hour and then calcined at 500° C. for 4 hours.

The catalysts, thus prepared, are designated 1% Pt/10% $SiO_2$—$Al_2O_3$, 1% Pt/30% $SiO_2$—$Al_2O_3$, 1% Pt/50% $SiO_2$—$Al_2O_3$, and 1% Pt/$Al_2O_3$, the last two being comparative samples, the last being especially considered a control sample.

Reaction analysis. The catalysts of the examples are placed in a quartz flow reactor and characterized under lean-burn conditions. Gases are blended to form a simulated lean-burn exhaust gas (of either a gasoline or diesel engine) in a manifold by means of mass flow controllers. The gases flow through the reactor and the post-catalyst gases later flow to an analytical train to determine the extent of reactions on various components of the gas, especially the NOx, as a function of temperature. The catalyst was tested employing a simulated feed gas composition ($C_3H_6$, 933 ppm; CO, 735 ppm; $H_2$, 245 ppm; NO 350 ppm; $O_2$, 14%; $SO_2$, 20 ppm; $CO_2$, 5%, $H_2O$, 4.6%; $N_2$, balance) at a space velocity (25,000 h$^{-1}$).

The results are shown in FIG. 1. The samples 1% Pt/10% $SiO_2$—$Al_2O_3$, 1% Pt/30% $SiO_2$—$Al_2O_3$, and 1% Pt/50% $SiO_2$—$Al_2O_3$ exhibit a NOx conversion of 51%, 57%, and 40% respectively. Thus increasing silica content from 10% to 30% leads to improved NOx conversion efficiency of the catalyst. Further increase in silica content to 50% results in reduction in NOx conversion. It is important to note that our Pt/$SiO_2$—$Al_2O_3$ catalysts provide significantly improved NOx conversion at the lower temperatures of 225° C. In contrast, the maximum conversion of NOx on control sample 1% Pt/$Al_2O_3$ is 45%.

Furthermore, invention catalysts, 1% Pt/10% $SiO_2$—$Al_2O_3$ and 1% Pt/30% $SiO_2$—$Al_2O_3$, show significantly higher NOx conversions at lower light off temperatures (FIG. 1) than the control sample, 1% Pt/$Al_2O_3$.

Figure 2:
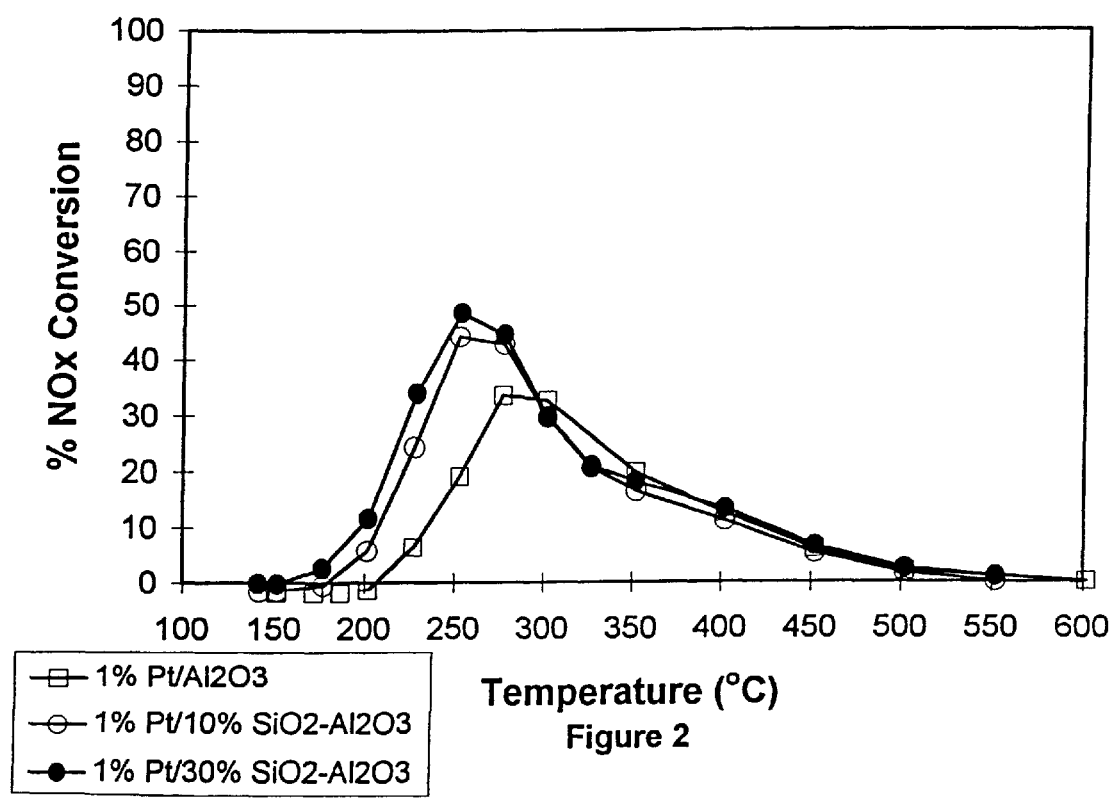
FIG. 2 is a graph of NOx conversion as a function of temperature which shows the resistance to hydrothermal aging at 750° C. for 16 h of 1% Pt/10% $SiO_2$—$Al_2O_3$, 1% Pt/30% $SiO_2$—$Al_{23}$, and 1% Pt/50% $SiO_2$—$Al_2O_3$ catalysts when exposed to simulated lean-burn engine exhaust. For comparison, NOx conversion data over hydrothermally aged 1% Pt/$Al_2O_3$ catalyst are also presented.

The catalysts 1% Pt/10% $SiO_2$—$Al_2O_3$ and 1% Pt/30% $SiO_2$—$Al_2O_3$, were hydrothermally aged at 750° C. for 16 hours in the presence of the feed gas mixture containing 350 ppm NOx, 14% $O_2$, 20 ppm $SO_2$, 5000 ppm $CO_2$ and 4600 ppm $H_2O$. A reevaluation of the catalysts (FIG. 2) showed that the 1% Pt/30% $SiO_2$—$Al_2O_3$ maintains a higher level of NOx activity in the lower temperature region of the temperature profile and achieves a maximum NOx conversion of 49% at 250° C. A 44% NOx conversion is observed for the 1% Pt/10% $SiO_2$—$Al_2O_3$ catalyst.

In contrast, the control 1% Pt/$Al_2O_3$ catalyst obtains a maximum NOx conversion of only 34% at 275° C.

This shows that both sol-gel processed catalysts according to the present invention provide lower NOx light off temperatures and show increased durability when compared to the control 1% Pt/$Al_2O_3$ catalyst.

We claim:

1. A method for treating diesel engine exhaust gases containing hydrocarbons, carbon monoxide, and nitrogen oxides (NOx), the steps comprising:
   locating in the exhaust gas passage of a diesel engine a catalyst comprising:
   (a) a composite oxide of silica-alumina support material comprising: (i) 5–40 wt. % silica based on the total of silica and alumina and (ii) made by sol-gel techniques from a mixture of an alumina sol and a silica sol; and
   (b) 0.25 to 4 wt. % platinum carried on the silica-alumina support material; and
   exposing said exhaust gas to said catalyst in an oxidizing atmosphere at 200–250° C., whereby over 50% of the nitrogen oxides are converted to non-polluting gases.

2. The method according to claim 1 wherein said silica comprises about 30 wt. % of said silica-alumina support.

3. The method according to claim 1 wherein said sols are made by hydrolyzing alkoxides of silicon or aluminum.

4. The method according to claim 3 wherein said silica sol is made by hydrolyzing silicon tetraethoxide in ethanol and water.

5. The method according to claim 3 wherein said alumina sol is made by hydrolyzing aluminum sec-butyl oxide in water.

6. The method according to claim 1 wherein said platinum is provided from a solution of chloroplatinic acid.

7. The method according to claim 1 deposited on a substrate.

8. The method according to claim 7 wherein the platinum is 0.05–1.4 wt. % based on the weight of the substrate.

* * * * *

UNITED STATES PATENT AND TRADEMARK OFFICE
CERTIFICATE OF CORRECTION

PATENT NO. : 6,165,430

DATED : December 26, 2000

INVENTOR(S) : Robert J. Kudla, et al.

It is certified that error appears in the above-identified patent and that said Letters Patent is hereby corrected as shown below:

On the Title Page,

Item [54] "METHOD FOR TREATING DIESEL ENGINE EXHAUST GAS" should be --PLATINUM-SILICA/ALUMINA SOL-GEL DIESEL CATALYST--.

Signed and Sealed this

Eighth Day of May, 2001

*Attest:*

NICHOLAS P. GODICI

*Attesting Officer*     *Acting Director of the United States Patent and Trademark Office*